United States Patent
Billmers et al.

(10) Patent No.: US 6,627,752 B1
(45) Date of Patent: Sep. 30, 2003

(54) LACTIDE MODIFIED STARCH DERIVATIVES AND THE PROCESS OF PREPARATION THEREOF

(75) Inventors: Robert L. Billmers, Stockton, NJ (US); David S. Roesser, Clinton, NJ (US)

(73) Assignee: National Starch and Chemical Investment Holding Company, New Castle, DE (US)

(*) Notice: Subject to any disclaimer, the term of this patent is extended or adjusted under 35 U.S.C. 154(b) by 238 days.

(21) Appl. No.: 09/632,296

(22) Filed: Aug. 3, 2000

(51) Int. Cl.[7] .................. C08B 31/02; C08B 31/04; C07H 1/00
(52) U.S. Cl. ............................ 536/110; 536/124
(58) Field of Search ................. 536/110, 124

(56) References Cited

U.S. PATENT DOCUMENTS

| | | | |
|---|---|---|---|
| 4,443,595 A | 4/1984 | Namikoshi et al. ........... 536/58 |
| 5,043,196 A | 8/1991 | Lacourse et al. .......... 428/35.6 |
| 5,247,013 A | * 9/1993 | Shinoda et al. ............. 525/54.2 |
| 5,540,929 A | 7/1996 | Narayan et al. ............. 424/422 |
| 5,693,786 A | * 12/1997 | Tanaka et al. .............. 536/107 |
| 5,756,556 A | 5/1998 | Tsai et al. .................. 521/84.1 |

FOREIGN PATENT DOCUMENTS

WO   WO 95/25750   9/1995   ........... C08B/31/02

OTHER PUBLICATIONS

Chemical Abstracts 119:183207r, Ester Grafted Starches for Biodegradable Thermoplastics, vol. 119, 1993, p. 146.
R.L. Whistler et al., "Starch: Chemistry and Technology", $2^{nd}$ Ed., Ch. X, 1984, p. 311–388.

* cited by examiner

Primary Examiner—James O. Wilson
Assistant Examiner—Everett White
(74) Attorney, Agent, or Firm—David LeCroy

(57) ABSTRACT

Starch lactide derivatives and the preparation of such derivatives wherein starch is reacted with lactide in an aqueous caustic media. Another embodiment involves the extrusion of the starch lactide derivatives to form starch based foam products having increased flexibility, strength and compatibility.

26 Claims, No Drawings

LACTIDE MODIFIED STARCH DERIVATIVES AND THE PROCESS OF PREPARATION THEREOF

BACKGROUND OF THE INVENTION

This invention relates to starch lactide diester derivatives and the preparation of such derivatives involving the reaction of starch with lactide in an aqueous caustic media. These derivatives are particularly useful in the formation of starch based foam products having increased flexibility and strength, and compatibility with synthetic polymers.

Various starch derivatives and modifications have been disclosed over the years and recently there have been many attempts to develop modified starches with biodegradable and other physical and chemical properties.

A review of starch derivatives and particularly starch esters can be found in "Starch: Chemistry and Technology", second edition, edited by R. L. Whistler et al., Chapter X, 1984. Additional disclosure of starch ester derivatives can be found in "Modified Starches: Properties and Uses", edited by O. B. Wurzburg, 1986, pp. 55–77.

U.S. Pat. No. 5,540,929 issued Jul. 30, 1996 to R. Narayan et al. Discloses biodegradable compositions comprising polysaccharides grafted with a cyclic aliphatic ester monomer in the presence of an organometallic polymerization agent. PCT patent application WO 95/25750 published Sep. 25, 1995 discloses starch derivatives grafted with aliphatic polyesters which are prepared in a procedure wherein a cyclic ester such as a lactone is polymerized with starch in a bulk polymerization using a transition metal catalyst. Japanese Patent 05125101 dated May 21, 1993, is disclosed in Chemical Abstracts 119:183207r and shows starches grafted with lactones or lactides using a non-aqueous solvent system.

Despite the various disclosures of starch derivatives and the preparation thereof as noted above, there still is the need for a starch derivative that is useful in the formation of foam products having increased flexibility and strength, and increased compatibility with synthetic polymers such as polycaprolactone, polylactic acid and polyesters.

SUMMARY OF THE INVENTION

This invention relates to starch lactide derivatives and the method of preparation where starch is reacted with lactide in an aqueous caustic medium. More particularly, this invention is directed to starch lactide diester derivatives having the following formula:

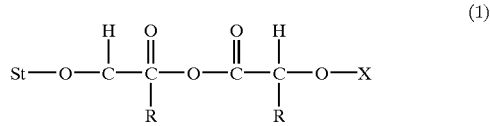

where St is the starch base material, X is H, alkali metal, alkaline earth metal or ammonium, R is alkyl of 1 to 3 carbon atoms, and from about 1 to 10% by weight of the diester group is bound to the starch, based on the dry weight of starch.

DETAILED DESCRIPTION OF THE INVENTION

This invention involves starch lactide diester derivatives which are useful in preparing starch foam products having increased flexibility and strength. The starch lactide derivatives have the formula (1), described above, and are prepared by modifying or reacting starch with lactide in an aqueous caustic system.

The base starch material used as the starting starch material in preparing the modified starch lactide may be any of several starches, native or modified. Such starches include those derived from any plant source including corn, potato, wheat, rice, tapioca, sago, sorghum, waxy maize and high amylose starch, i.e. starch having at least 40% and more particularly at least 65% by weight of amylose content, such as high amylose corn, etc. Starch flours may also be used as a starch source. Also included are the conversion products derived from any of the former bases including, for example, dextrin prepared by hydrolytic action of acid and/or heat; oxidized starches prepared by treatment with oxidants such as sodium hypochlorite; fluidity to thin boiling starches prepared by enzyme conversion or mild acid hydrolysis; and derivatized and crosslinked starches.

The starting starch material used in this invention, as described above, can be unmodifed or modified and the term starch as used herein includes both types. By modified it is meant that the starch can be derivatized or modified by typical processes known in the art, e.g., esterification, etherification, oxidation, acid hydrolysis, crosslinking and enzyme conversion. Typically, modified starches include esters, such as the acetate and the half-esters of dicarboxylic acids, particularly the alkenylsuccinic acids; ethers, such as the hydroxyethyl and hydroxypropyl starches; and cationic starches such as starch modified with 2-diethylaminoethyl chloride (DEC) and starch modified with quaternary ammonium reagents such as 3-chloro-2-4-hydroxypropyltrimethylammonium chloride; starches oxidized with hypochlorite; starches reacted with crosslinking agents such as phosphorus oxychloride, epichlorohydrin, and phosphate derivatives prepared by reaction with sodium or potassium orthophosphate to tripolyphosphate and combinations thereof. Derivatized starches include cationic, anionic, amphoteric, non-ionic and crosslinked starches. These and other conventional modifications of starch are described in "Starch: Chemistry and Technology", second edition, edited by R. L. Whistler, et al., Chapter X, 1984. Due to the nature of the starch ester, other modifications should preferably be accomplished before treatment with the lactide to avoid hydrolysis of the starch ester.

The starches of this invention can be granular or dispersed, i.e., cooked, extruded, spray-dried, etc. In the case of modification of dispersed starches, the final product must be recovered by means other than filtration. This includes, but is not limited to spray-drying, freeze-drying, precipitation from solvent, etc.

In one preferred embodiment, the starch material is a high amylose starch, i.e., one containing at least 40%, by weight to amylose and more preferably at least 65%, by weight, of amylose.

One modification of the starch starting material that is especially useful in this invention is the etherification with alkylene oxides, particularly those containing 2 to 6, preferably 2 to 4 carbon atoms. Ethylene oxide, propylene oxide and butylene oxide are exemplary compounds that are useful in etherifying the starting starch material, with propylene oxide being especially preferred. Varying amounts of such compounds may be used depending on the desired properties and economics. Generally, up to 15% or more, more particularly 1 to 15% and preferably, up to about 10%, more particularly 1 to 10% by weight, of bound alkylene group, based on the weight of starch, will be used.

The starch lactides of this invention (1) are prepared by reacting starch with lactide or lactide derivative, i.e. a cyclic ester having a six membered ring with the formula:

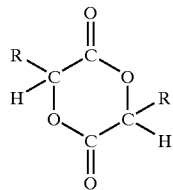

where R is alkyl of 1 to 3 carbons and preferably 1 carbon atom. The lactide or cyclic diester is formed from its corresponding a-hydroxy acid by esterification.

The starch starting material is modified or reacted with lactide by adding starch and lactide in a caustic aqueous medium at room temperature using either an aqueous slurry or aqueous dispersion of the starch material. The reaction is carried out under alkaline conditions at a pH of about 7 to 10 and preferably about 7 to 8. The pH is conveniently controlled by the periodic addition of a dilute aqueous solution of an alkali material.

Any alkali material may be used as the alkali reagent or alkali medium in the method of this invention. Particularly useful alkali materials are the alkali metal hydroxides and alkaline earth metal hydroxides or the Group IA or IIA hydroxides, oxides, carbonates or other salts. Illustrative alkali materials are sodium hydroxide, potassium hydroxide, calcium hydroxide, ammonium hydroxide, magnesium hydroxide, sodium carbonate and trisodium phosphate. Preferred alkali are the alkali metal hydroxides and most preferred is sodium hydroxide and potassium hydroxide.

The reaction is carried out at room temperature (typically about 22.5° C.) although a range of temperatures can be used, more particularly about 5 to 45° C. and preferably about 20 to 30° C.

The amount of lactide to be used in modifying the starch material will vary to some degree depending on the properties desired and the nature of the starch. While the amount of lactide can vary from about 1 to 50% or more, based on the weight of starch, more particularly from about 1 to 30% and preferably from about 5 to 20% by weight of lactide will be used based on the weight of starch. The amount of derivative group bound to the starch, i. e.

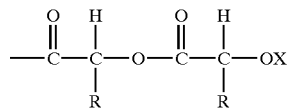

will be from about 1 to 10% and preferably from about 1.5 to 5% by weight, based on the weight of dry starch.

The lactide modified starches of this invention are particularly useful in preparing starch-based foams. Such foam products have improved flexibility and strength and can be prepared using an extrusion process in accordance with known procedures. Typical extrusion processes for forming starch foamed products are disclosed in U.S. Pat. Nos. 5,043,196 issued Aug. 27, 1991 to Lacourse et al. and U.S. Pat. No. 5,756,556 issued May 26, 1998 to Tsai et al. In such patents, which are incorporated herein by reference, 30 extrusion of starch is carried out at a temperature of from about 100 to 250° C. under a total moisture content of up to about 25%, more particularly from about 8 to 25% and preferably about 10 to 21% by weight, based on the weight of starch. Addition of a nucleating agent or salt to the starch feed also is useful to improve processing and properties of the expanded product. The lactide modifed starches of this invention may also be useful in the preparation of other biodegradable articles and products of different sizes, shapes and forms and may be made by a number of operations such as foaming, filming compression molding, injection molding, blow molding, extrusion, co-extrusion, vacuum forming, thermoforming, and combinations thereof.

The modified starches of this invention will provide better compatibility and enhanced physical properties when blended with synthetic polymers such as polyvinyl alcohol, polycaprolactone, polylactic acid, and polyesters.

Depending on the application, the modified starch can range in amount from about 1 to 99% and preferably about 10 to 50%, by weight, of the blend.

The following examples further illustrate the embodiments of this invention. In the examples, all parts and percentages are given by weight and all temperatures are in degrees Celsius unless otherwise noted.

EXAMPLE 1

Modification of Starch with Lactide (3,6-Dimethyl-1,4-dioxane-2,5-dione)

A total of 1000 g of Hylon VI I starch (high amylose corn starch with about 70% amylose content, available from National Starch and Chemical Company, was slurried into 1500 mL of cold (200C) water in a 4 L stainless steel beaker and mixed with an overhead stirrer until uniform. The reaction vessel was equipped with a pH control unit set to deliver 3% NaOH solution to a set pH point of 7.5. Powdered I-lactide was added at a rate of 5 g/15 minutes until a total of 100 g of lactide were added. The reaction was stirred an additional hour while maintaining the pH. The pH of the slurry was then adjusted to 5.0–6.0 with dilute HCl and the slurry was filtered and washed with water to remove residual reagents. The sample was then spread onto trays and air dried to about 10% moisture.

Analysis of the starch derivative was accomplished by slurrying 5.000 g of sample with known moisture into 250 mL of distilled water. The slurry was heated in a boiling water bath for 10 minutes and cooled to room temperature by placing in a cold water bath. The sample was then titrated to a phendlphthalein end point using 0.1 N NaOH. Fifty (50) mL of 0.1 N NaOH was added and stirred for 48 hours in a sealed beaker. The sample was titrated until colorless with 0.1 N HCl and the quantity of HCl recorded. The amount of bound lactide was determined using the following formula:

% bound lactide=144.13 [5.0–(mL HCl×0.1)]/anhydrous sample weight

The results for different starch samples are given below in Table 1.

TABLE 1

| Sample | Starch Type | Treatment Level (%) | Bound Diester (%) |
|--------|-------------|---------------------|-------------------|
| 1 | Hylon VI1 | 5 | 1.79 |
| 2 | Hylon VI1 | 10 | 2.26 |
| 3 | Corn | 10 | 2.54 |

The examples shown above illustrate the modification of starch with lactide under aqueous condition to provide modified starches with diester lactide pendent chains.

EXAMPLE 2

Extrusion of Diester Lactide Containing Starches

The modified starch prepared in Example 1 was dry blended with microtalc (nucleating agent) for a total of 2% ash. The moisture content of the starch was measured and additional water was added to the extruder at the inlet to obtain a total of 17–19% water in the material exiting the die. The starch was fed into a Werner-Pfleiderer ZSK-30 twin screw extruder configured with 7 barrels and moderate shear design. The sample was heated to 1800C (thermal and mechanical energy) by the time it got to the die. Foaming occurred as the molten starch exited through 5 mm openings at the end of the die body. The product was allowed to equilibrate to 50% relative humidity and then evaluated for compressibility and resilience and compared to other samples made with unmodified starches. The foamed products made with different modified samples is shown below in Table2.

TABLE 2

| Starch Type | Modification (% bound) | Foam Properties |
| --- | --- | --- |
| Hylon VII | none | brittle |
| Hylon VII | Propylene Oxide (5%) | fair |
| Corn | Propylene Oxide (4%) | brittle |
| Hylon VII | Lactide (2.5%) | fair |
| Hylon VII | Lactide (2.3%)/Propylene Oxide (5%) | good |
| Corn | Lactide (2.5%) | fair |

The samples illustrated in this example demonstrate improved properties when the starches are modified with lactide. Addition of other modifications such as propylene oxide show even further improvements.

What is claimed is:

1. A starch lactide diester derivative having the formula:

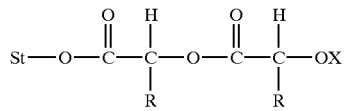

where St is starch, R is alkyl of 1 to 3 carbon atoms, X is H, alkali metal, alkaline earth metal or ammonium and from about 1 to 10% by weight of the diester group, based on the weight of dry starch, is bound to the starch.

2. The starch derivative of claim 1 wherein the R is methyl.

3. The starch derivative of claim 1 wherein the starch is high amylose having at least 40% by weight of amylose content.

4. The starch derivative of claim 1 wherein the starch is high amylose corn starch.

5. The starch derivative of claim 1 wherein the starch is further modified with about 1 to about 15% by weight of bound alkylene oxide having 2 to 6 carbon atoms.

6. The starch derivative of claim 5 wherein the alkylene oxide is propylene oxide.

7. The starch derivative of claim 1 wherein the R is methyl.

8. The starch derivative of claim 1 wherein from about 1.5 to 5% by weight of the diester group is bound to the starch.

9. The starch derivative of claim 8 wherein the starch is high amylose starch having at least 40% by weight of amylose content.

10. The starch derivative of claim 9 wherein the R group is methyl.

11. The starch derivative of claim 10 wherein the starch is high amylose corn starch.

12. The starch derivative of claim 10 wherein the starch is further modified with about 1 to 15%, by weight, of bound alkylene oxide having 2 to 6 carbon atoms.

13. The starch derivative of claim 12 wherein the starch is high amylose corn starch and the atlcylene oxide is propylene oxide.

14. The starch derivative of claim 13 wherein the starch has at least 65% by weight of amylose content.

15. The method of preparing a starch-based foam product comprising extruding starch having the composition of claim 1 in the presence of a total moisture content of up to about 25% and at a temperature of from about 100 to 250° C.

16. The method of claim 15 wherein the starch has at least 40% by weight of amylose content.

17. The method of claim 16 wherein the starch is further modified with from about 1 to about 15% by weight of bound alkylene oxide having 2 to 6 carbon atoms.

18. The method of claim 17 wherein the starch is high amylose corn starch having at least 65% by weight of amylose content and the alkylene oxide is propylene oxide.

19. The method of claim 15 wherein from about 1.5 to about 5% by weight of the diester group is bound to the starch.

20. A method of preparing a starch lactide derivative wherein starch is reacted with lactide in an aqueous caustic system.

21. The method of claim 20 wherein the lactide has the formula:

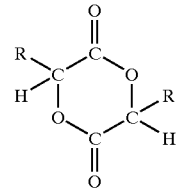

where R is alkyl of 1 to 3 carbon atoms.

22. The method of claim 20 wherein the system has a pH of about 7 to about 10.

23. The method of claim 20 wherein the starch is high amylose starch having at least 40% by weight of amylose content.

24. The method of claim 20 wherein the starch is high amylose corn starch.

25. The method of claim 20 wherein the starch is further modified with from about 1 to about 15% by weight of bound alkylene oxide having 2 to 6 carbon atoms.

26. The method of claim 25 wherein the starch has an amylose content of at least 65% by weight and the alkylene oxide is propylene oxide.

* * * * *